US 6,471,134 B2

(12) United States Patent
Chamot et al.

(10) Patent No.: US 6,471,134 B2
(45) Date of Patent: Oct. 29, 2002

(54) THERMOSTATIC DEVICE HAVING TWO REGULATING CONDITIONS AND TWO THERMOSTATIC ELEMENTS

(75) Inventors: Jean Chamot, Arpajon; Lionel Jean Mabboux, Sainte Genevieve des Bois, both of (FR)

(73) Assignee: Vernet S.A., Cedex (FR)

( * ) Notice: Subject to any disclaimer, the term of this patent is extended or adjusted under 35 U.S.C. 154(b) by 0 days.

(21) Appl. No.: 09/809,179

(22) Filed: Mar. 16, 2001

(65) Prior Publication Data
US 2001/0010210 A1 Aug. 2, 2001

(51) Int. Cl.[7] .................................................. F01P 7/16
(52) U.S. Cl. ...................... 236/34.5; 236/68 R
(58) Field of Search .................. 236/34, 34.5, 68 R

(56) References Cited

U.S. PATENT DOCUMENTS

| 3,907,199 A | * | 9/1975 | Kreger ........................ 236/34.5 |
| 4,961,530 A | * | 10/1990 | Wagner ...................... 236/34.5 |
| 5,385,296 A | * | 1/1995 | Kurz et al. ................ 236/34.5 |
| 5,676,308 A | * | 10/1997 | Saur ........................... 236/34.5 |
| 5,775,270 A | * | 7/1998 | Huemer et al. ........... 236/68 R |
| 5,979,778 A | * | 11/1999 | Saur ........................... 236/34.5 |

FOREIGN PATENT DOCUMENTS

| EP | 484 624 | 5/1992 |
| EP | 694 423 | 1/1996 |

* cited by examiner

Primary Examiner—William E. Tapolcai
(74) Attorney, Agent, or Firm—Wenderoth, Lind & Ponack, L.L.P.

(57) ABSTRACT

A device, which can be used in the cooling circuits of internal combustion engines comprises a chamber (3) having at least three ports (4, 5, 6) two of which can be closed off by valves (9, 10) carried by a main thermostatic element (7) housed partially in the chamber. One valve moves away from its seat when the other moves towards its own seat. A pipe (1) entering the chamber (3) via one of the two seats contains a thermostatic threshold-setting element (17) carrying a moveable compensator (21) provided with a moveable stop (16) for the main thermostatic element (7). The thermostatic setting element (17) has an electrical heater which can be connected to an electrical power supply that can be selectively activated and deactivated in order, when deactivated, to decrease the distance between the stop (16) and the seat (14) in the pipe and thus the temperature for which this seat is released.

11 Claims, 3 Drawing Sheets

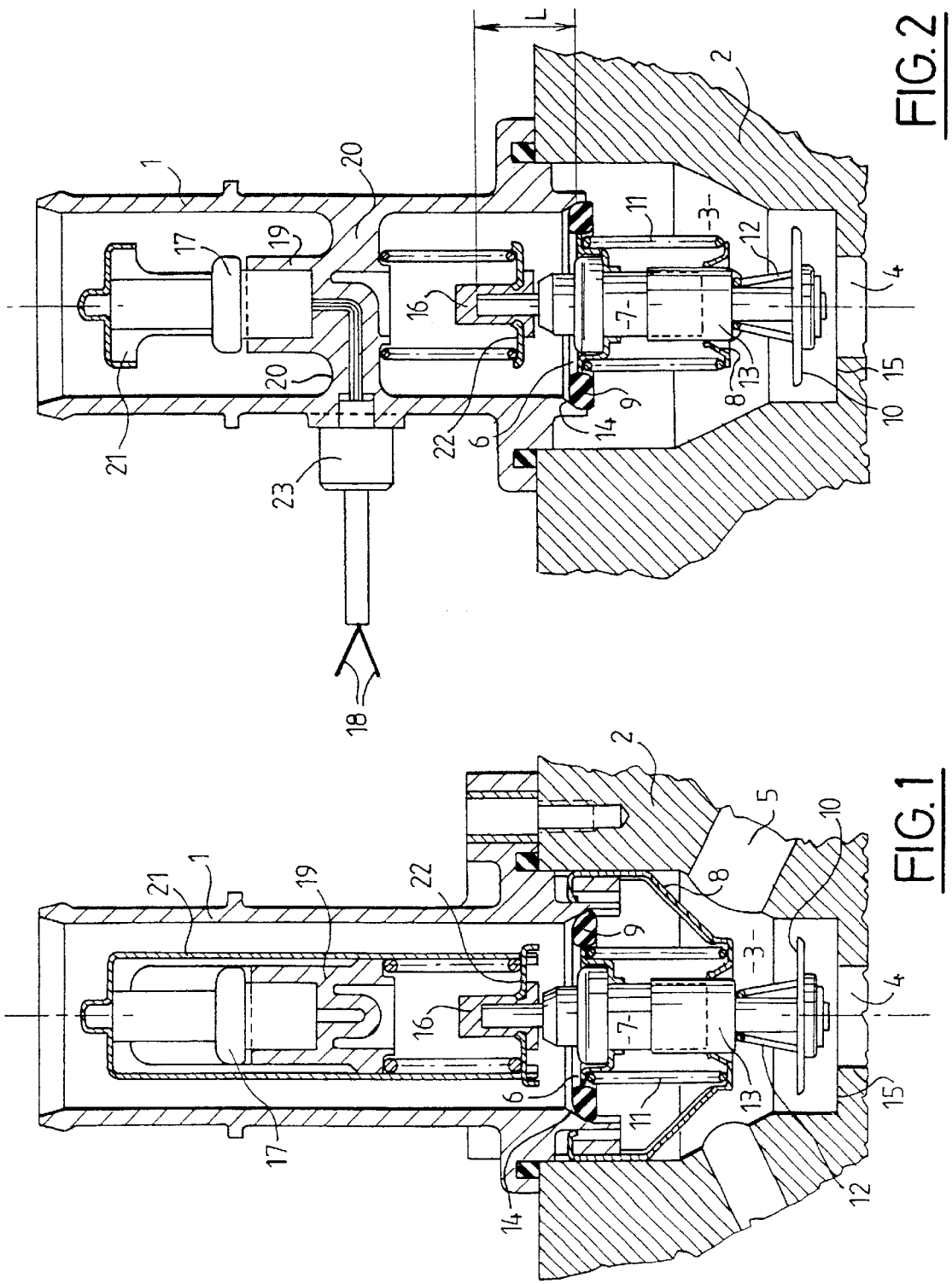

THERMOSTATIC DEVICE HAVING TWO REGULATING CONDITIONS AND TWO THERMOSTATIC ELEMENTS

BACKGROUND OF THE INVENTION

1. Field of the Invention

The invention relates to a thermostatic device having two operating thresholds so as to provide two regulating ranges which can be selectively activated.

Such devices are useful especially in the field of motor vehicles, for the purpose of optimizing the cooling of the vehicle's engine depending on the load on it.

2. Description of Related Art

Conventionally, the liquid cooling circuit for internal combustion engines comprises a system of hoses connecting the engine to a cooling radiator into which a thermostatic device is inserted. The thermostatic device modifying, in the liquid intended for the engine, the proportion of so-called "cold" liquid coming from the radiator to the so-called "hot" liquid which has not passed through the latter, so as to deliver to the engine block coolant at the same, in principle optimized, temperature whatever the circumstances.

However, it has proved to be the case that the engine, when under a very high load, "heats up" to such an extent that maintaining the normally optimal temperature at the inlet of the engine leads to an internal engine temperature likely to damage it.

In order to avoid this drawback, it is known to choose as the liquid injection temperature a lower temperature than the normally optimal temperature, and thus at a low load, which corresponds to the case in which a vehicle is used most often, the engine operates appreciably below the optimal value and the fuel consumption and pollution are increased.

For the purpose of remedying this new drawback, the subject-matter of document FR 93/11 919 relates to a thermostatic device having a single thermostatic element, which regulates the temperature by means of a valve and shifts the regulating range only when the engine is operating under full load, in order then to regulate it at a lower temperature than the optimal temperature under normal conditions, generally approximately at half load. For this purpose, the thermostatic element includes an electrical heating member providing it with additional heating when a suitably placed probe detects that the engine is operating near its full load. However, should the system for electrically heating the element fail, the situation always returns to the high-temperature regulation corresponding to the half load, which carries risks of damaging the engine when it is operating at full load. Furthermore, should the thermostatic element itself fail, it no longer fulfils its regulating function and the regulating valve remains closed, which very rapidly leads to engine damage.

Again for the purpose of alleviating this drawback, the subject-matter of document FR 85/15 967 and that of U.S. Pat. No. 4,875,437 relate to a thermostatic device comprising a regulating element placed in the cooling circuit and a heated offsetting element which is placed outside the cooling circuit. By means of this design, even if the heated offsetting element itself should fail, a regulating action remains, but this regulating is at a high temperature, which means that risks of damaging the engine when the latter is operating at full load remain.

SUMMARY OF THE INVENTION

It is an object of the present invention to alleviate these drawbacks and for this purpose the subject of the present invention is a thermostatic device having two regulating conditions. The thermostatic device comprising a moveable fluid-metering component which includes two valves and is designed to move in a chamber having a first, fluid inlet, port, a second, fluid outlet, port and at least one third port. At least two of these three ports are surrounded by respective seats in the case of the two valves so that when any one of the valves leaves its seat and moves away therefrom, the other one moves towards its own seat possibly as far as closure. The moveable metering component is carried by one part of a thermostatic fluid-metering element which can move with respect to another part of the thermostatic element, which part is arranged at least partially outside the chamber. The device is characterized in that it comprises a casing part in the form of a pipe, one end of which enters the chamber via a valve seat surrounding one of the ports of the chamber. The pipe contains a thermostatic threshold-setting element having a moveable part carrying a moveable threshold-setting component provided with a moveable stop in the case of that part of the thermostatic metering element which is outside the chamber. Also, the thermostatic threshold-setting element has electrical heating means suitable for being electrically connected to an electrical power supply that can be selectively activated and deactivated so that, when the setting element is not heated, the distance between the moveable stop and the port seat on the side facing the pipe, and thus the temperature for which this seat is released by its valve, are less than when it is heated.

Thus, in the event of a mechanical or electrical failure (including a failure of the control electronics) other than complete destruction of the device, in the absence of any additional expansion of the threshold-setting element, the device always regulates, not at a high temperature, but at a low temperature.

The device may also have one or more of the following features:

1) the pipe is centered on a longitudinal axis, on which the two valve seats are also centered, and the moveable part of the thermostatic element which carries the moveable component comprising the two valves can move in longitudinal translation along this axis;

2) the moveable component of the thermostatic threshold-setting element has a stationary part housed in a socket inside the pipe and connected to the wall of the latter, and a moveable part having a free end turned towards one end of the pipe, which is on the opposite side of the seat for the pipe;

3) the moveable component of the thermostatic threshold-setting element comprises a yoke-shaped compensator extending in the direction of the seat of the pipe, and the moveable stop is carried by this moveable component at the ends of arms of the yoke, which are located on the same side as the frustoconical seat;

4) the electrical heating means comprise a resistance heating element housed in a stationary part of the thermostatic threshold-setting element, the fixed part being carried by a socket inside the pipe;

5) the electrical heating means are connected by electrical conductors to an electrical power supply, which is also connected to a temperature detection probe suitable for detecting the temperature of a liquid;

6) the electrical heating means are connected by electrical conductors to an electrical power supply, which is also connected to a temperature detection probe suitable for detecting the temperature of a liquid and to an alarm, so that, when the probe detects a temperature at least equal to a predetermined safety temperature, the electrical power supply is deactivated and thus, on the one hand, the setting element is not electrically heated and the device regulates within a low temperature range and, on the other hand, the alarm is activated;

7) the chamber includes an outlet port surrounded by a seat made in the pipe for a valve, an outlet port surrounded by a seat for a valve, and an inlet port;

8) the inlet port is an inlet port for hot liquid coming from an engine, for example of a vehicle, and the outlet ports are outlet ports for hot liquid which are suitable for being connected, respectively, to an inlet of a cooling radiator and to an inlet of the engine possibly via a circulating pump;

9) the chamber has an inlet port surrounded by a seat made in the pipe for a valve, an inlet port surrounded by a seat for a valve, and an outlet port;

10) the inlet port surrounded by a seat made in the pipe is an inlet port for cold liquid, suitable for being connected to a cooling radiator, for example of a vehicle, the other inlet port is an inlet port for hot liquid coming from an engine of the vehicle, and the outlet port is an outlet port for hot liquid or for cold liquid or for a mixture of hot liquid and cold liquid, depending on the position of the thermostatic metering element.

BRIEF DESCRIPTION OF THE DRAWINGS

Further features and advantages of the invention will become apparent from the description which follows of one embodiment of the invention given by way of non-limiting example and illustrated in the appended drawings in which:

FIG. 1 is a longitudinal sectional view of a device according to the present invention;

FIG. 2 is another longitudinal sectional view of the device according to the present invention, in a plane perpendicular to the plane of section shown in FIG. 1;

DETAILED DESCRIPTION OF THE INVENTION

Figure 3:
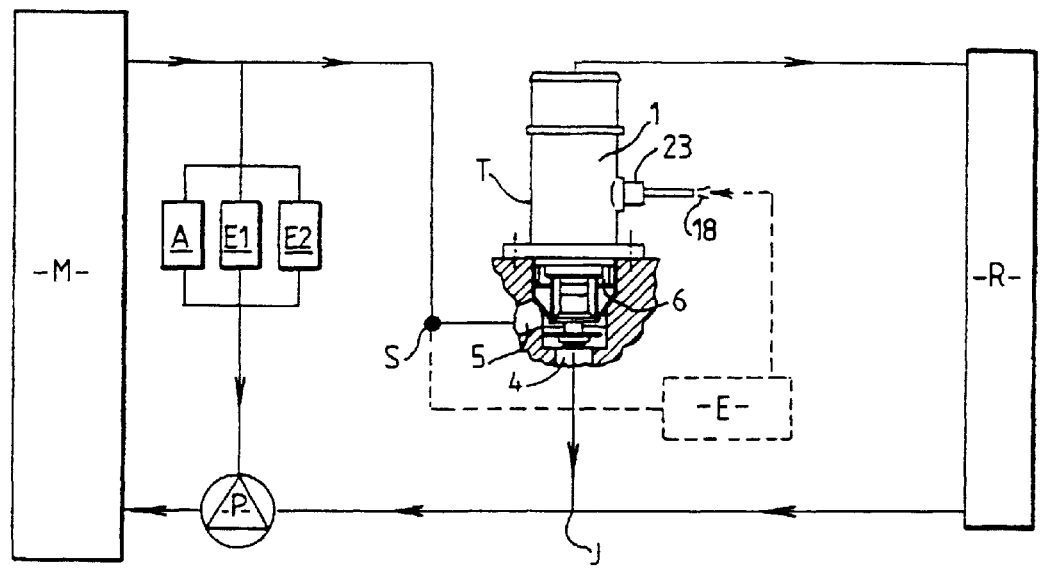
FIG. 3 shows schematically the arrangement of the device shown in FIGS. 1 and 2 in a cooling circuit for a vehicle having an internal combustion engine.

In the figures, so as not to clutter up the drawing, a large number of components and of lines relating to components which are to the rear of the planes of section have not been shown, but the description which follows will make the arrangement of the device according to the present invention easier to understand.

The thermostatic device shown comprises, in a known manner, various members housed in a casing formed by a pipe 1 and by a body 2 which may consist of a region of a vehicle engine surrounding a chamber 3 for transit of the coolant. The chamber is hollowed out in this region and various fluid flow channels terminate in this chamber, as will be seen later. The pipe 1 is secured to the body 2 here by bolts.

The pipe 1 and the chamber 3 have a generally axisymmetric shape with an approximately circular cross section and extend in alignment along the same central longitudinal axis.

According to the invention, the chamber 3 has at least three ports 4, 5, 6 the function of which depends on the mode of use of the device and especially on how it is fitted into the engine cooling circuit. A first port is an inlet port for so-called "hot" fluid coming from the engine, a second port is a fluid outlet port for discharging from the chamber that proportion of the fluid intended to be sent to the engine, generally via a circulating pump, and a third port, connected to a cooling radiator, may, depending on how the device is fitted in the cooling circuit, be a "hot" fluid outlet port connected to the inlet of the radiator or a "cooled" or "cold" fluid inlet port connected to the outlet of the radiator. A possible fourth port may be an inlet port for hot fluid coming from various apparatuses to be cooled, such as an air heater or exchangers. One of the end regions of the pipe 1 emerges in the chamber 3, entering the latter, and it is the corresponding orifice which forms the third fluid port. The first and second ports 4, 5 are the mouths of two channels terminating in the chamber, one on the opposite side from the third port 6 and centered on the central axis of the device, and the other laterally.

At least partially housed inside the chamber is a translationally moveable part of a thermostatic element 7 with, here, wax, the moveable part being carried and guided in a yoke 8 extending along the chamber 3. The yoke is fastened to the end region of the pipe 1. This moveable part of the thermostatic element 7 carries a moveable component comprising two valves 9, 10 which are placed, respectively, so as to bear against flanges in the end regions on the opposite side from this moveable part of the thermostatic element. The two valves 9, 10 are slipped around the moveable part of the thermostatic element and are urged towards their respective flanges by one end of an elastic member such as a spring 11, 12, the opposite end of which bears against the yoke 8 in the case of the spring of one of the valves and against a socket 13 partially surrounding the body of the thermostatic element in the case of the other valve.

At least two of the first three ports 4, 5, 6 of the chamber are surrounded by respective seats 15, 14 in the case of the two valves 10, 9 centered on the longitudinal axis of the pipe 1. These are, on the one hand, the port 4 formed by the channel mouth centered on the axis of the device, the seat 15 of which, machined in the body 2, is flat and extends perpendicular to the central axis of the device in order to accommodate a flat valve close to the free end of the moveable part of the thermostatic element 7. And, on the other hand, the third port 6, the seat 14 of which, machined in the end region of the pipe 1, is frustoconical and flared towards the inside of the chamber 3 in order to accommodate a valve 9 of corresponding shape close to part of the thermostatic element which is placed at least partially (here completely) outside the chamber, more specifically in the pipe 1, usually called the "stationary part", but which here is also able to move, as will be seen later. It should be noted that this usually stationary part comprises a piston, mounted so as to slide in a cup containing a wax that can expand greatly when heated.

Since the two valves 9, 10 are mounted near the two opposite ends of that part of the thermostatic element 7 which can move translationally along the longitudinal axis in the chamber 3, between their two respective seats 14, 15, when either one of the two valves leaves its seat and moves away therefrom, the other moves towards its own seat, with a possibility of bearing on the latter if the amplitude of the movement is sufficient. The cylindrical spring 11 of the frustoconical valve 9, bearing against the fixed yoke 8, is compressed when this valve moves away from its seat, whereas the frustoconical spring 12 of the flat valve 10 bearing against the moveable socket 13 is compressed, when, this valve being in abutment, the translational movement continues, and fulfils the role of an overtravel spring.

Thus, if that part of the thermostatic element 7, which lies in the pipe 1, is kept stationary by means of a stop 16, this arrangement allows, if the two valved ports 4, 6 are outlets and at least one other port 5 is an inlet, relative metering of the outflows and, if the two valved ports 4, 6 are inlets and at least one other port 5 is an outlet, metering of the proportions of the inflows into the outflow. In both cases, an operating condition is therefore obtained which is determined by the position of the stop 16, characterized by the distance L which separates the stop surface for the so-called stationary part of the thermostatic metering element 7 from the bearing region of the seat 14 for the frustoconical valve 9. The region is called the "box" of the thermostatic device. The tripping threshold of the thermostatic device, that is to say the temperature for which the frustoconical valve leaves its seat, depends on the value of the box.

According to the invention, in order to obtain two (or more) operating conditions of the thermostatic device and more particularly of the thermostatic fluid-metering element 7 and of the moveable fluid-metering component which it carries, the box of the device is selectively modified, and to do this the position of the stop 16 in the pipe 1, and thus the so-called stationary part of the thermostatic element 7, can move depending on the position of the stop 16. Thus, in order to obtain two operating conditions corresponding to two different tripping thresholds, all that is required is to provide two possible positions for the stop 16.

For this purpose, placed in the pipe 1 is another thermostatic element 17 having (actual) stationary part and a moveable part carrying a moveable component provided with a moveable stop 16 for the so-called stationary part of the thermostatic fluid-metering element 7. This other threshold-setting, thermostatic element 17 includes electrical heating means preferably consisting of a resistance heating element or a thermistor known in the art as a PTC thermistor, suitable for being connected via electrical conductors 18 to a power supply that can be selectively activated and deactivated, in order for the thermostatic element 17 to be selectively heated.

For the purpose of positioning the thermostatic threshold-setting element 17 in the pipe 1, the latter has, internally and more or less centrally if reference is made to its length and to its cross section, a socket 19 connected to the wall of the pipe by two bridges 20 of material which extend radially, one lying in the extension of the other.

The socket 19 opens towards that end of the pipe 1 which is on the opposite side from the frustoconical seat 14, in order to accommodate the stationary part of the thermostatic element 17, here with wax, consisting of the cup for the thermostatic element, in such a way that the free end of the moveable part of this element, formed by a piston, faces towards this end of the pipe, and the elongation of the element 17 due to the expansion of wax thus occurs towards the end in question of the pipe 1, and not towards the seat.

The piston of the thermostatic threshold-setting element 17 carries a yoke-shaped compensator 21 extending in the direction of the frustoconical seat 14 for the pipe in the case of the frustoconical valve of the thermostatic metering element 7, the arms of which are guided by the outer surface of the socket 19. The ends of the arms of the compensator 21 on the same side as the frustoconical seat carry a washer 22 having a central hole into which is clipped the moveable stop 16 for the so-called stationary part of the thermostatic fluid-metering element 7. The moveable stop 16 is made in the form of a pivot bearing in which the piston of the thermostatic element 7 bears.

The resistance heating element of the thermostatic threshold-setting element 17 is housed in the fixed cup of the latter. This may, for example, be a resistor screen-printed on an insulating board or else a component wound in a helix, known commercially by the name Thermocoax. The electrical conductors 18 for connecting the resistor to the power supply are housed in a channel provided in the support socket 19 for the thermostatic element 17 and one of the bridges 20 of material connecting the socket 19 to the wall of the pipe, and they pass through a gland 23 fastened into this wall, in the extension of this bridge of material.

It follows from this arrangement that when the thermostatic threshold-setting element 17 is heated, it extends in such a way that the compensator 21 moves away from the frustoconical seat 14 for the pipe 1 and moves towards the opposite end of the pipe, driving the moveable stop 16 for the thermostatic fluid-metering element 7. This results in an elongation of the box L of this thermostatic element 7, and thus a relatively large expansion of the latter is needed in order for the frustoconical valve 9 to leave its seat 14 and for the flat seal 10 to move towards its own seat, since at the start of its elongation the so-called stationary part of the thermostatic metering element 7 is not immobilized and therefore moves towards the bottom of the stop 16. When the thermostatic threshold-setting element is deactivated, it contracts, the compensator 21 moves towards the frustoconical seat 14, the box of the thermostatic metering element 7 is shortened due to the cooling of the thermostatic element by the coolant which surrounds it, which is at a lower temperature, and a small expansion of the thermostatic metering element is sufficient to make the frustoconical valve 9 separate from its seat 14. In this case it is desirable for the expansion of the thermostatic threshold-setting element 17 to be essentially caused by its heating by the electrical power supply and not by an increase in the temperature of the fluid which surrounds it, so that its expansions and contractions can be caused selectively by an electrical signal.

It may be noted that an electrical failure and most mechanical failures result in the impossibility of the thermostatic threshold-setting element 17 expanding, and therefore a relatively small expansion of the thermostatic metering element 7 is sufficient to cause the frustoconical valve 9 to separate from its seat 14.

The thermostatic device has two regulating conditions and can be used in a circuit for cooling an internal combustion engine in various ways.

FIG. 3 shows a thermostatic device T as described above in an arrangement called an "engine outflow" arrangement.

More specifically, the port 5, without a valve, of the thermostatic device T is an inlet connected to the coolant outlet of an engine M and is therefore fed with hot liquid. The port 6 with a frustoconical valve is an outlet connected to the inlet of a cooling radiator R into which the outlet sends hot liquid to be cooled. The port 4 with a flat valve is an outlet for hot liquid connected to an inlet of a circulating pump P. The outlet is connected to the coolant inlet for the engine, in order to send some of the hot liquid coming from the port 5 to this pump, depending on the position of the thermostatic metering element 7, to which hot liquid is added cooled liquid coming from the radiator R at a junction J joined, on the one hand, to the thermostatic device T and, on the other hand, to the radiator R. Inserted into one or more parallel branches connected, on one side, to the line joining the outlet of the engine to the inlet port 5 without a valve and, on the other side, to an additional inlet of the pump P are an air heater A and gearbox-oil and engine-oil exchangers E1, E2, respectively. An electronic control and supply unit E is connected electrically, on one side, to a temperature probe S which detects the temperature of the hot liquid coming from the engine and going into the thermostatic device T and, on the other side, to the thermostatic device T via the conductors 18, for selectively supplying, or not, the thermostatic threshold-setting element 17 with its heating energy, depending on the temperature detected. Preferably, the unit E is also connected to an alarm (not shown) which is visible and/or audible to the driver. The alarm is intended to be activated by the unit E when the probe S detects a temperature at least equal to a predetermined safety temperature.

Figure 4:
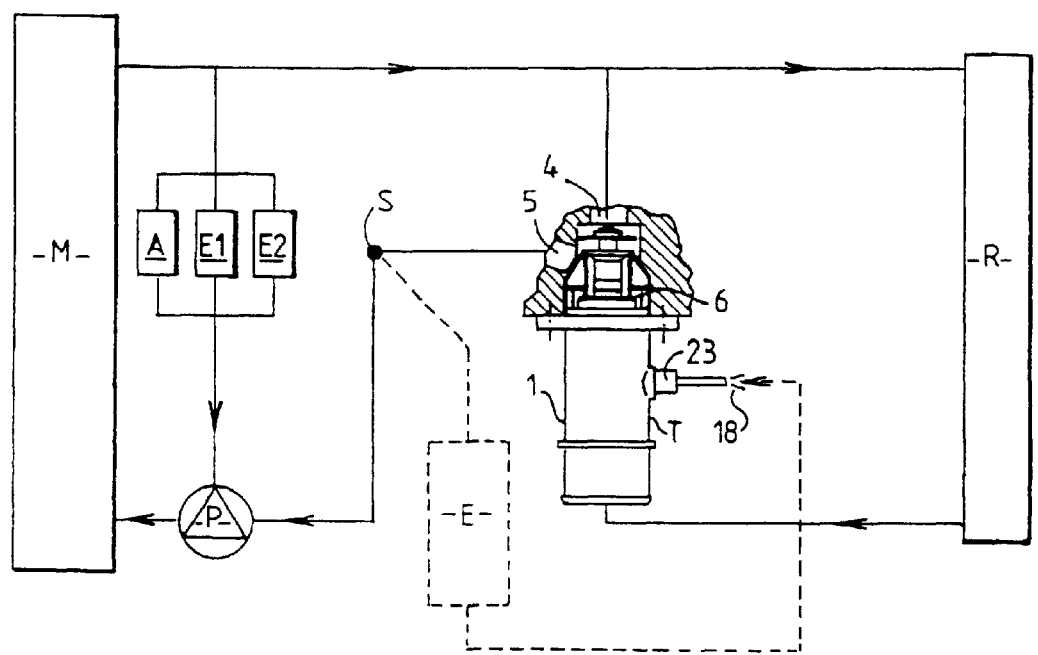
FIG. 4 shows schematically an alternative form of the arrangement shown in FIG. 3.

FIG. 4 shows a thermostatic device as described above in an arrangement called an "engine inflow" arrangement (the same numerical references denote the same elements as previously).

The port 4 with a flat valve is an inlet connected to the coolant outlet of an engine M to which is also connected the inlet of a cooling radiator R, in order to receive a hot liquid therefrom. The port 6 with a frustoconical valve is an inlet connected to the outlet of the cooling radiator R in order to receive cold liquid therefrom. The port 5 without a valve is a liquid outlet which can thus be a mixture of hot liquid and cold liquid, or hot liquid, or cold liquid, connected to an inlet of a circulating pump P. The outlet of the circulating pump is connected to the coolant inlet of the engine, in order to send to it liquid whose temperature depends on the position of the thermostatic metering element 7. Inserted into one or more parallel branches connected, on one side, to the line joining the outlet of the engine to the inlet port 4 with a flat valve and, on the other side, to an additional inlet of the pump P are an air heater A and gearbox-oil and engine-oil exchangers E1, E2 respectively. An electronic control and supply unit E is electrically connected, on one side, to a temperature probe S which detects the temperature of the liquid going to the engine and coming from the thermostatic device T and, on the other side, to the thermostatic device T via the conductors 18, for selectively delivering, or not, to the thermostatic threshold-setting element 17 its heating energy, depending on the temperature detected. Preferably, the unit E is also connected to an alarm (not shown) which is visible and/or audible to the driver, intended to be activated by the unit E when the probe S detects a temperature at least equal to a predetermined safety temperature.

In the two arrangements in FIGS. 3 and 4, instead of using electrical heating for low-temperature regulation (engine at full load), such heating is used for high-temperature regulation (engine at about half load).

Figure 5:
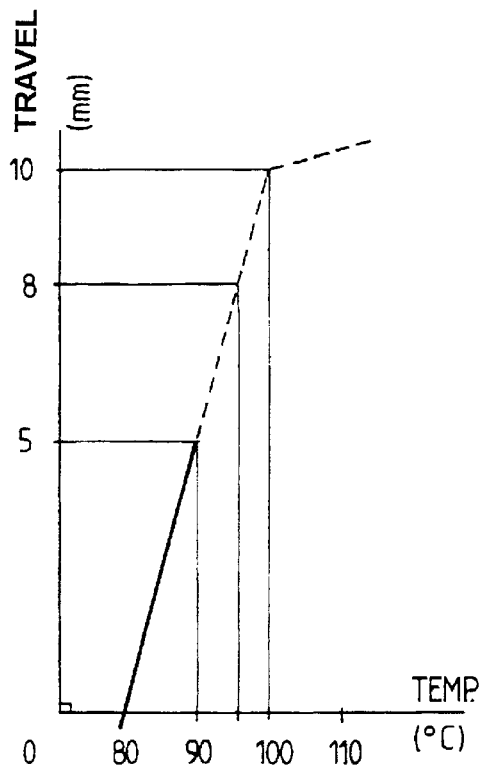
FIGS. 5 and 6 are diagrams illustrating the operation of the device according to the present invention in the cooling circuits shown schematically in FIGS. 3 and 4.
Figure 6:
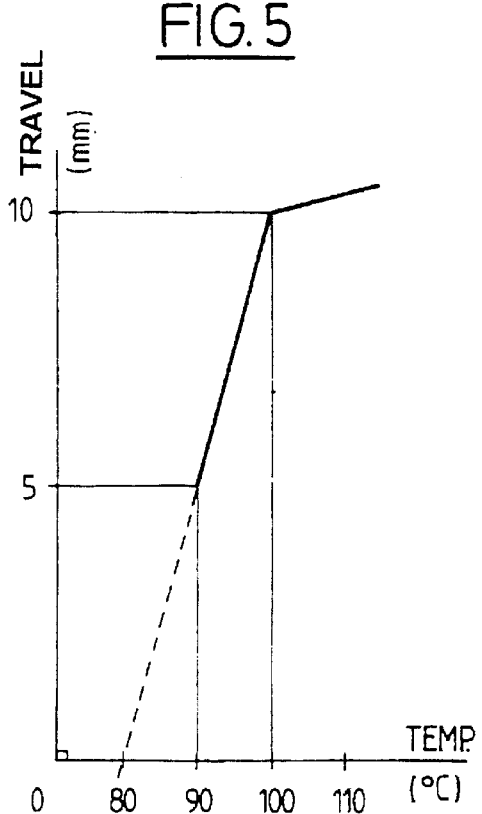

FIGS. 5 and 6 illustrate an example of how the thermostatic device according to the invention is operated, whether in the arrangement in FIG. 3 or in that in FIG. 4, and therefore show the "elongational travel of the piston of the main element versus regulating temperature" curve, on the one hand for low temperature regulation (FIG. 5: engine at full load, and the threshold-setting element not heated) and on the other hand for high-temperature regulation (FIG. 6: engine at half load and threshold-setting element heated).

If, with the engine running at full load, the threshold-setting element 17 is not heated, the elongational travel of the piston from its retracted position is five millimeters, which corresponds to a regulating temperature T1 as indicated by the probe S in FIG. 4, lying within the (low) range from 80° C. to 90° C. If, with the engine operating at half load, the threshold-setting element 17 is heated, the elongational travel of the piston is also five millimeters, but counted beyond the five millimeters of the previous travel, which corresponds to a regulating temperature T2 as indicated by the probe S in FIG. 4, lying within the (high) range from 90° C. to 112° C.

Again, in the same example, a safety temperature T3 above the high range, for example T3=113° C., is chosen for which, if it is detected by the probe S, the system automatically reverts to low-temperature regulation whatever the engine load conditions, and an alarm also connected to the electronic unit E, visible or audible to the vehicle's driver, is triggered. Thus, if the probe S detects a temperature at least equal to T3, the electrical supply for the setting element 17 is deactivated, the setting element is not electrically heated and the alarm is activated.

Here, in most cases of failure of the thermostatic device T or of the electronic unit E, a coolant is therefore injected into the engine at the temperature appropriate for operation of the engine at full load, and the risks of damaging the engine are considerably reduced, unlike the devices known hitherto.

What is claimed is:

1. A thermostatic device having two regulating conditions and being capable of being received in a chamber having a first port defining a fluid inlet port, a second port defining a fluid outlet port, at least one third port, and a valve seat surrounding one of said first, second and third ports, said thermostatic device comprising:

a casing in the form of a pipe having a first end adapted to be received in chamber and defining a first valve seat surrounding one of the first, second and third ports of the chamber, a thermostatic fluid-metering element disposed in said casing and having a moveable fluid-metering component that includes two valves and is movable in the chamber, wherein said valves cooperate with said first and second valve seats, respectively, so that when one of said valves moves away from its respective valve seat, the other of said valves moves towards its respective valve seat, wherein said moveable fluid-metering component is movable with respect to a part of said thermostatic fluid-metering element, which extends at least partially outside of the chamber; and a thermostatic threshold-setting element disposed in a part of said casing located outside of the chamber, said thermostatic threshold-setting element having a moveable part carrying a moveable threshold-setting component provided with a moveable stop that cooperates with the part of said thermostatic fluid-metering element that extends at least partially outside of the chamber, said thermostatic threshold-setting element having an electrical heating device for being electrically connected to an electrical power supply that can be selectively activated and deactivated so that, when said thermostatic threshold-setting element is not heated, the distance between the movable stop and the first valve seat is less than when said thermostatic threshold-setting element is heated.

2. The thermostatic device as claimed in claim 1, wherein said casing is centered on a longitudinal axis, and the first and second valve seats are centered on the longitudinal axis, wherein the moveable fluid-metering component is moveable in a longitudinal direction along the longitudinal axis.

3. The thermostatic device as claimed in claim 1, further comprising a socket connected to an inside wall of said casing, wherein said thermostatic threshold-setting element has a stationary part, which is housed in said socket, and a moveable part having a free end that is directed toward an end of the casing that is opposite relative to the first seat.

4. The thermostatic device as claimed in claim 3, wherein the moveable part of the thermostatic threshold-setting element comprises a yoke-shaped compensator having a plurality of arms that extend toward the first valve seat and are connected to the moveable stop.

5. The thermostatic device as claimed in claim 1, further comprising a socket fixed by a stationary structure to said casing, said socket receiving a stationary part of the thermostatic threshold-setting element, wherein said electrical heating device comprises a resistance heating element housed in said stationary structure.

6. The thermostatic device as claimed in claim 1, wherein said electrical heating device is connected by electrical conductors to an electrical power supply, which is connected to a temperature detection probe for detecting the temperature of a liquid.

7. The thermostatic device as claimed in claim 1, wherein said electrical heating device is connected by electrical conductors to an electrical power supply, which is connected to an alarm and a temperature detection probe for detecting the temperature of a liquid, wherein, when the probe detects a temperature, which is at least equal to a predetermined safety temperature, the electrical power supply is deactivated and the thermostatic threshold-setting element is not electrically heated, and the device regulates in a low temperature range and the alarm is activated.

8. A thermostatic device having two regulating conditions, said thermostatic device comprising:

a body defining a chamber having a first outlet port, a second outlet port, a first valve seat surrounding said second outlet port, and an inlet port;

a casing in the form of a pipe having an inner end disposed in said chamber, and a second valve seat formed at the inner end of said pipe and surrounding the first outlet port, a thermostatic fluid-metering element disposed in said casing and having a moveable fluid-metering component that includes two valves and is movable in said chamber, wherein said valves cooperate with said first and second valve seats, respectively, so that when one of said valves moves away from its respective valve seat, the other of said valves moves towards its respective valve seat, wherein said moveable fluid-metering component is movable with respect to a part of said thermostatic fluid-metering element, which extends at least partially outside of said chamber; and a thermostatic threshold-setting element disposed in a part of said casing located outside of said chamber, said thermostatic threshold-setting element having a moveable part carrying a moveable threshold-setting component provided with a moveable stop that cooperates with the part of said thermostatic fluid-metering element that extends at least partially outside of said chamber, said thermostatic threshold-setting element having an electrical heating device adapted to be electrically connected to an electrical power supply that can be selectively activated and deactivated so that, when said thermostatic threshold-setting element is not heated, the distance between the movable stop and the first valve seat is less than when said thermostatic threshold-setting element is heated.

9. The thermostatic device as claimed in claim 8, wherein said inlet port is an inlet port for hot liquid from an engine, and said outlet ports are outlet ports for hot liquid capable for being connected to an inlet of a cooling radiator and to an inlet of the engine.

10. A thermostatic device having two regulating conditions, said thermostatic device comprising:

a body defining a chamber having a first inlet port, a second inlet port, a first valve seat surrounding said second inlet port, and an outlet port;

a casing in the form of a pipe having an inner end disposed in said chamber, and a second valve seat formed at the inner end of said pipe and surrounding the first inlet port, a thermostatic fluid-metering element disposed in said casing and having a moveable fluid-metering component that includes two valves and is movable in said chamber, wherein said valves cooperate with said first and second valve seats, respectively, so that when one of said valves moves away from its respective valve seat, the other of said valves moves towards its respective valve seat, wherein said moveable fluid-metering component is movable with respect to a part of said thermostatic fluid-metering element, which extends at least partially outside of said chamber; and a thermostatic threshold-setting element disposed in a part of said casing located outside of said chamber, said thermostatic threshold-setting element having a moveable part carrying a moveable threshold-setting component provided with a moveable stop that cooperates with the part of said thermostatic fluid-metering element that extends at least partially outside of said chamber, said thermostatic threshold-setting element having an electrical heating device adapted to be electrically connected to an electrical power supply that can be selectively activated and deactivated so that, when said thermostatic threshold-setting element is not heated, the distance between the movable stop and the first valve seat is less than when said thermostatic threshold-setting element is heated.

11. The thermostatic device as claimed in claim 10, wherein the first inlet port is an inlet port for cold liquid and is adapted to be connected to a cooling radiator, and the second inlet port is an inlet port for hot liquid from an engine, and the outlet port is an outlet port for hot liquid, cold liquid, or a mixture of the hot and cold liquids depending on the position of the thermostatic metering element.

* * * * *